(12) United States Patent
DuPuis et al.

(10) Patent No.: US 7,841,579 B2
(45) Date of Patent: Nov. 30, 2010

(54) PIEZOELECTRIC ACTUATOR WITH A GIMBALLED VALVE

(75) Inventors: Paul DuPuis, Glendale, AZ (US); Lee Vetsch, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 408 days.

(21) Appl. No.: 12/114,585

(22) Filed: May 2, 2008

(65) Prior Publication Data

US 2009/0173387 A1    Jul. 9, 2009

Related U.S. Application Data

(63) Continuation-in-part of application No. 11/934,000, filed on Nov. 1, 2007.

(51) Int. Cl.
*F16K 31/02*  (2006.01)

(52) U.S. Cl. .................... 251/86; 251/129.06

(58) Field of Classification Search ............... 251/84, 251/86, 129.06, 359, 331, 335.2
See application file for complete search history.

(56) References Cited

U.S. PATENT DOCUMENTS

| | | | |
|---|---|---|---|
| 4,131,130 A | 12/1978 | Ruby | |
| 4,690,465 A | 9/1987 | Takeda et al. | |
| 4,768,751 A | 9/1988 | Giachino et al. | |
| 5,092,360 A * | 3/1992 | Watanabe et al. | 137/487.5 |
| 5,217,283 A | 6/1993 | Watanabe | |
| 5,267,589 A | 12/1993 | Watanabe | |
| 5,309,943 A | 5/1994 | Stevenson et al. | |
| 5,628,411 A * | 5/1997 | Mills et al. | 209/644 |
| 6,095,175 A * | 8/2000 | Miller et al. | 137/15.18 |
| 6,202,669 B1 | 3/2001 | Vetsch et al. | |
| 6,345,803 B2 * | 2/2002 | Sakurai | 251/129.06 |
| 6,520,479 B1 * | 2/2003 | Sato | 251/129.06 |
| 6,799,745 B2 * | 10/2004 | Schmauser et al. | 251/129.06 |
| 2003/0159735 A1 * | 8/2003 | Barillot et al. | 137/554 |
| 2004/0000843 A1 * | 1/2004 | East | 310/331 |
| 2004/0069964 A1 * | 4/2004 | Voss | 251/129.06 |

* cited by examiner

*Primary Examiner*—John Bastianelli
(74) *Attorney, Agent, or Firm*—Fogg & Powers LLC

(57) ABSTRACT

A gimballed valve for a flow control valve operates as a sealing member for an adjustable nozzle and is coupled to a piezoelectric actuator having stacked piezoelectric members that are toroidally shaped. The gimballed valve includes at least two support rings and a center closure member. In one embodiment only an outermost support is in contact with at least one member of the piezoelectric actuator. The support rings may be concentrically arranged and coupled together with flexure members. The center closure member operates to seal against an orifice in the adjustable nozzle and may deflect upon contact with the adjustable nozzle to account for misalignment issues that may arise during machining and/or assembly of the flow control valve.

15 Claims, 4 Drawing Sheets

US 7,841,579 B2

PIEZOELECTRIC ACTUATOR WITH A GIMBALLED VALVE

PRIORITY

This application is a continuation-in-part application and claims priority to U.S. patent application Ser. No. 11/934,000 filed on Nov. 1, 2007, the subject matter of which is incorporated herein by reference in its entirety.

BACKGROUND OF THE INVENTION

Flow control valves are used to control fluid flow rates in a variety of applications. One particular application relates to controlling a flow (e.g., gas or liquid) in a pneumatic test apparatus when testing various pneumatic pressure systems or components that are to be installed on an aircraft. By way of example, one type of pneumatic test apparatus is an air data tester (ADT), which is often employed in ground testing aircraft aerospace systems or components. One type of aerospace test system simulates in-flight air pressures to supply pneumatic data to an aircraft control and display avionics system, which in turn provides data regarding the aircraft's altitude, vertical speed, airspeed, Mach number, etc.

The flow control valve must be capable of precisely duplicating in-flight pneumatic pressures normally encountered by an aircraft over its entire flight profile. Existing valves, such as those described in U.S. Pat. Nos. 4,131,130 and 6,202,669 are generally complex assemblies that are sensitive to a number of individual part tolerances between nozzle orifices. The valves described in the identified patents include an electromagnetic torque motor for moving a flapper mechanism relative to a nozzle orifice of a pressure fitting. Due to the complexity of the assemblies and the interrelated mechanical tolerance sensitivity, the aforementioned valves are difficult to manufacture in large quantities in a short period of time. In addition, the complex assembly increases cost.

SUMMARY OF THE INVENTION

The present invention generally relates to a gimballed valve for a flow control valve that operates as a sealing member for an adjustable nozzle and is coupled to a piezoelectric actuator having stacked piezoelectric members that are toroidally shaped. The gimballed valve includes a number of support rings and in one embodiment only an outermost support is in contact with at least one member of the piezoelectric actuator. The support rings may be concentrically arranged and coupled together with flexure members. A center or innermost support ring operates to seal against an orifice in the adjustable nozzle. The innermost support may deflect upon contact with the adjustable nozzle to account for misalignment issues that may arise during machining and/or assembly of the flow control valve.

In one aspect of the invention, a piezoelectric actuator includes a plurality of piezoelectric members positioned in a stacked arrangement. Each member includes a toroidal shape with an inner surface defining a central opening and a coaxial axis. A gimballed valve includes at least two support rings and a center closure member. The at least two support rings are coupled together with a pair of flexure members and comprise an outer support ring and an inner support ring. The inner support ring is coupled to the center closure member with another pair of flexure members. The outer support ring is coupled to one of the piezoelectric members such that at least the center closure member is located positioned over the central opening.

In another aspect of the invention, a method for regulating fluid flow to a chamber of a flow control valve includes the steps of (1) supplying an amount of fluid or gas to an adjustable nozzle coupled to a pressure fitting, the pressure fitting received in a bore formed in a support structure of the flow control valve, the pressure fitting oriented along a longitudinal axis of the bore, the adjustable nozzle having an orifice in fluid communication with the chamber and the pressure fitting; (2) controllably changing a dimension of a piezoelectric actuator located within the chamber to selectively move a gimballed closure device into and out of contact with the orifice of the adjustable nozzle; and (3) deflecting the gimballed closure device with a surface of the adjustable nozzle having the orifice to correct an amount of sealing misalignment between the surface and a surface of the gimballed closure device to regulate a flow rate of the fluid as the fluid exits the chamber.

In yet another aspect of the invention, a flow control valve includes a piezoelectric actuator having at least one piezoelectric member positioned in a stacked arrangement. The at least one member includes a toroidal shape with an inner surface defining a central opening and a coaxial axis. A gimballed valve includes at least two support rings coupled together with a pair of flexure members and comprising an outer support ring and an inner support ring. The inner support ring is coupled to the center closure member with another pair of flexure members. The outer support ring is coupled to one of the piezoelectric members such that at least the center closure member is located positioned over the central opening.

BRIEF DESCRIPTION OF THE DRAWINGS

Preferred and alternative embodiments of the present invention are described in detail below with reference to the following drawings.

DETAILED DESCRIPTION OF ONE EMBODIMENT

Figure 1:
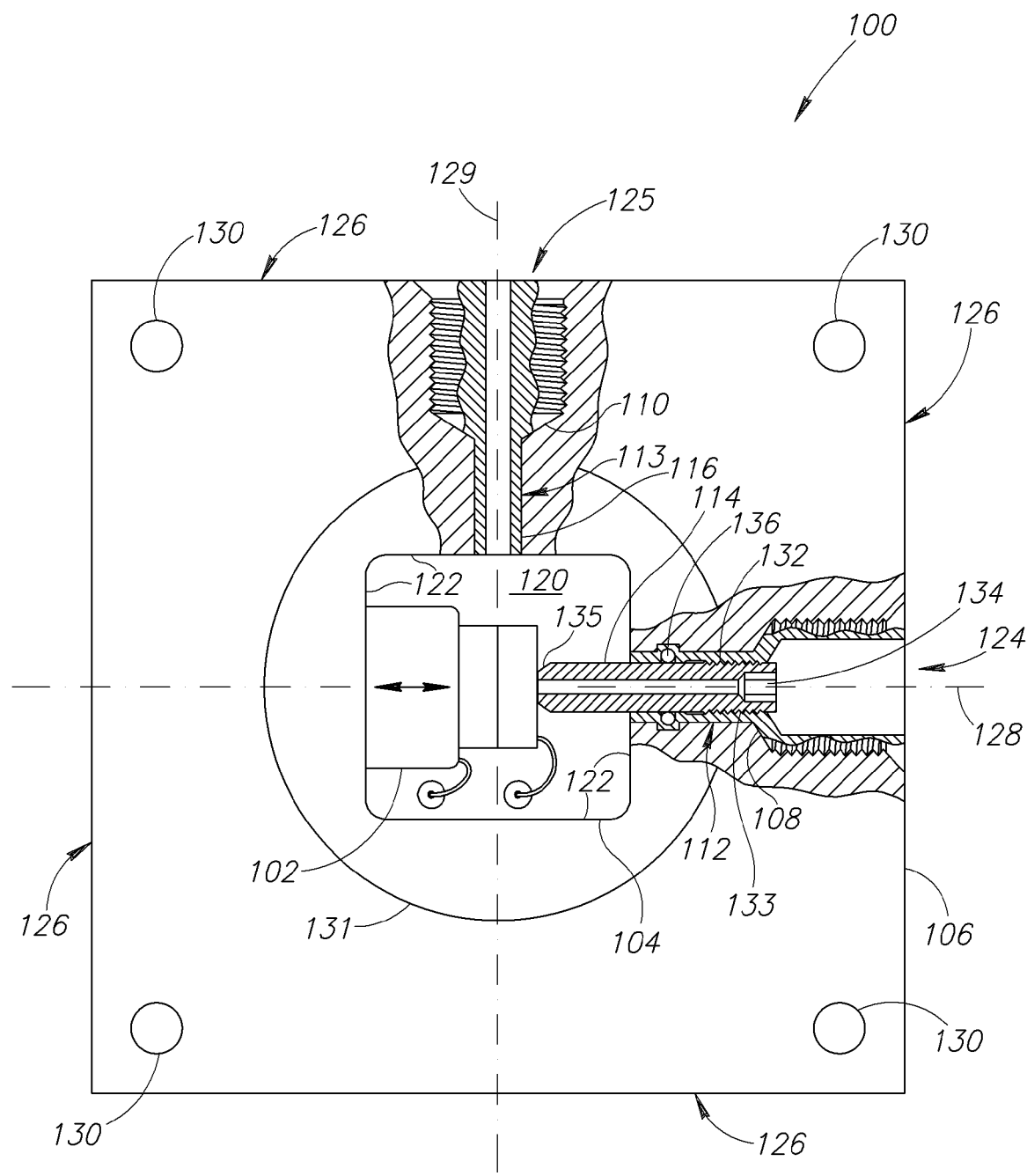
FIG. 1 is top plan schematic view of a flow control valve having an piezoelectric actuator according to an embodiment of the invention.

FIG. 1 shows a flow control valve 100 having a piezoelectric actuator 102 located within a chamber 104 of a valve support structure 106 according to an embodiment of the invention. The flow control valve 100 may be used to control a flow of fluid into the chamber 104. The flow control valve 100 may be employed to proportionally modulate the flow into the chamber 104 to achieve a desired output flow rate of the fluid. The flow control valve 100 further includes a first pressure fitting 108 and a second pressure fitting 110 coupled to and positioned within passages 112, 113 formed in the support structure 106. In the illustrated embodiment, an adjustable nozzle 114 is coupled to the first pressure fitting 108 and a fixed orifice 116 coupling the second pressure fitting 110 to the plenum chamber 104.

In one embodiment, the support structure 106 is a machined, one-inch (25.40 millimeters) thick plate having approximately a two-inch (50.80 millimeters) square area (width multiplied by length). The plate may be made from a variety of materials, such as aluminum, steel, titanium, etc. Machining material out of the support structure 106 forms the chamber 104. The chamber 104 may take a variety of shapes, but preferably does not extend through the thickness of the plate. In the event that the chamber 104 extends through the thickness of the support structure 106, a cover plate (not shown) may be used to close off an exterior side of the chamber 104. In the illustrated embodiment, the chamber 104 is relatively square having a floor surface 120 and four inner side walls 122.

The passages 112, 113 for the pressure fittings 108, 110 extend, respectively, from the inner side walls 122 of the chamber 104 through the support structure 106 to openings 124, 125 on exterior surfaces 126 of the support structure 106. In one embodiment, the passages 112, 113 have respective longitudinal axes 128, 129, which are arranged substantially perpendicular to each other. For example the passage 112 with longitudinal axis 128 is positioned at a three o'clock position while the passage 113 with longitudinal axis 129 is positioned at a twelve o'clock position. In addition to the aforementioned features, the support structure 106 may further include mounting holes 130 for securing a cover plate (not shown) to the support structure 106. Further, the cover plate may be sized to extend beyond a groove or boundary region 131 formed in the support structure 106. The groove 131 may receive an o-ring seal (not shown).

In one embodiment, both pressure fittings 108, 110 comply with military specification MS33649, but it is appreciated that other types of pressure fittings compatible with other specifications and compatible with the support structure 106 may be utilized. The pressure fittings 108, 110 are received in passages 112, 113 and along longitudinal axes 128, 129, respectively, and are coupled to the support structure 106. In the illustrated embodiment, the pressure fittings 108, 110 are threadably coupled to or tapped into the support structure 106. The first pressure fitting 108 includes the adjustable nozzle 114 while the second pressure fitting 110 includes the fixed orifice 116. At least a portion of the nozzle 114 extends into the chamber 104.

The adjustable nozzle 114 includes an engagement portion 132 for coupling the adjustable nozzle 114 to the first pressure fitting 108. In one embodiment, the engagement portion 132 includes finely machined threads 133 that allow the adjustable nozzle 114 to be moved in small increments relative to the support structure 106. The engagement portion 132 is received by a complementary portion of the first pressure fitting 108. Adjustment of the adjustable nozzle 114 may be achieved with a tool engagement opening 134, which may take the form of a hex setscrew configured to receive a hex-shaped tool (not shown). In one embodiment, the adjustable nozzle 114 includes a nose cap 135. A seal 136, such as an o-ring seal, provides a fluid-tight fit between the adjustable nozzle 114 and the first pressure fitting 108.

The piezoelectric actuator 102 is coupled to a sealing member 138 (FIG. 2), and both are located within the chamber 104. A unique aspect of the piezoelectric actuator 102 is its ability to change its dimensional shape by a small amount when subjected to an externally applied voltage of a desired polarity. Some of the more common piezoelectric materials are poly-crystalline ceramics based on lead zirconate titanate and barium titanate compositions. In some instances, additives may be added to the piezoelectric material to alter the dielectric, piezoelectric and/or physical properties of the resulting composition. In one embodiment, the piezoelectric actuator 102 is a piezo-ceramic actuator.

Figure 2:
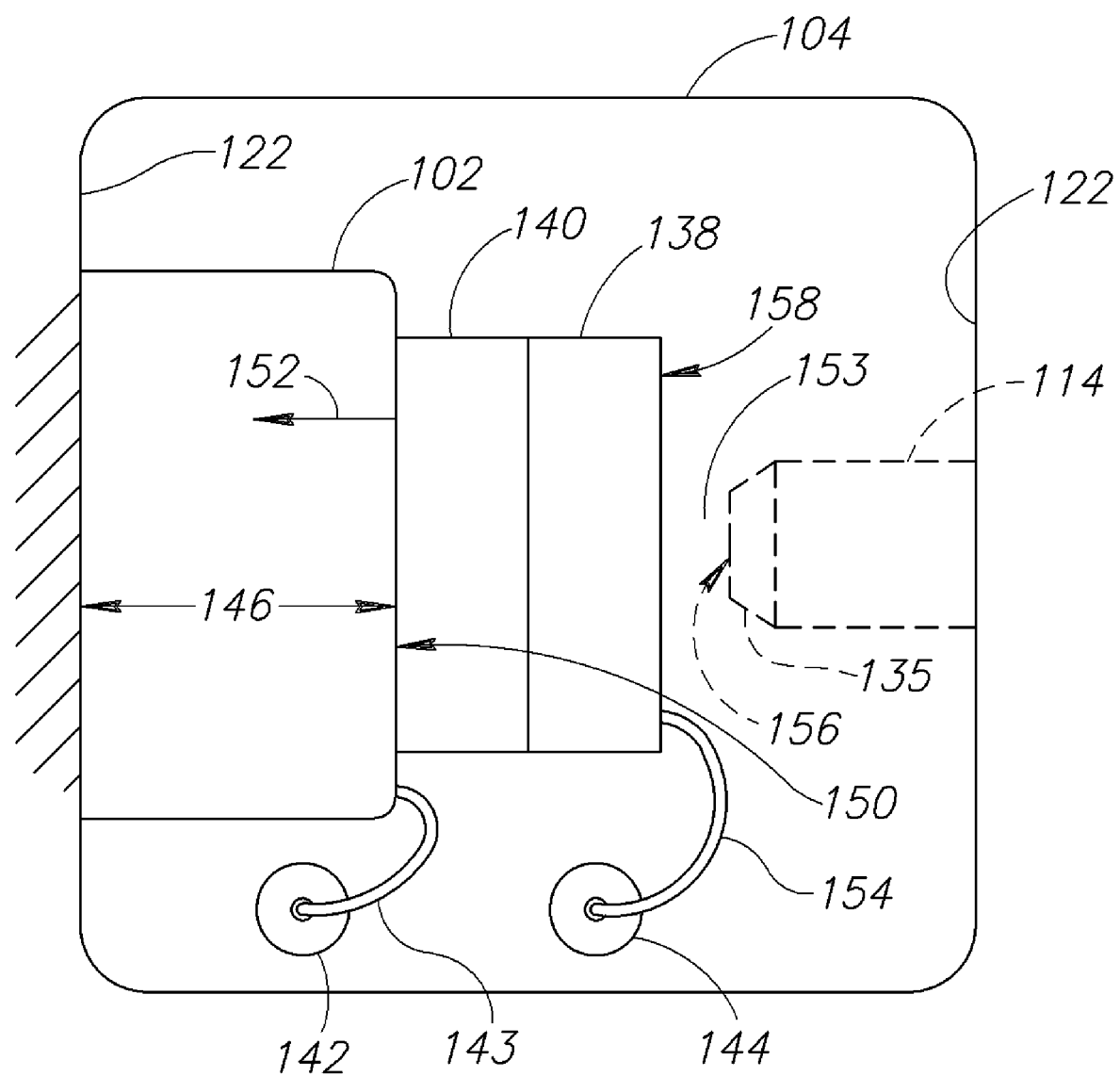
FIG. 2 is an expanded, top plan schematic view of a chamber and a piezoelectric actuator of the flow control valve of FIG. 1.

FIG. 2 is an expanded, top plan view of the chamber 104 containing only the piezoelectric actuator 102, the sealing member 138, an insulating spacer 140, and electrical feed-through 142, 144. Electrical excitation of the piezoelectric actuator is applied between the case (as one electrode) and the face 150 of the actuator via electrical connection 143. Electrical connection 154 is used to sense when the face 158 of the sealing surface comes in contact with a nose cap end face 156. The pressure fittings 108, 110 are not shown in detail for purposes of clarity. The piezoelectric actuator 102 is fixed to the sidewall 122 of the chamber 104 opposite the sidewall 122 that receives the adjustable nozzle 114. One side of the piezoelectric actuator 102 is grounded to the support structure 106. The other side is connected to the electrical feed-through 142 through the electrical connection 143, which takes the form of a wire. In one embodiment, alternate metallizations between ceramic donuts comprising the piezoelectric actuator 102 are connected to the support structure 106 and intervening metallizations are connected to the electrical connection 143. The support structure 106 operates as an electrical terminal. Polarities of the ceramic donuts are alternated such that the positive sides of all donuts are connected to the support structure 106 and the negative sides are connected to the electrical connection 143 or vice versa.

In addition, the piezoelectric actuator 102 is coupled to the sealing member 138 and yet electrically insulated from the sealing member 138 via the intermediate insulating spacer 140. In one embodiment, the intermediate insulating spacer 140 takes the form of a donut shaped ceramic insulator that is bonded or otherwise attached to the piezoelectric actuator 102 and to the sealing member 138.

The piezoelectric actuator 102 includes a first dimension 146 that is substantially parallel to the longitudinal axis 128 (FIG. 1) of the first passage 112. In operation, the first dimension 146 is reduced or shrunk when the piezoelectric actuator 102 is subjected to the externally applied voltage of the desired polarity via the electrical feed-through 142. The reduction of the first dimension 146 causes a free face 150 of the piezoelectric actuator 102, the intermediate insulating spacer 140 and the sealing member 138 to move away from the nose cap end face 156 of the adjustable nozzle 114 in a direction indicated by an arrow 152. It is understood that other dimensions of the piezoelectric actuator 102 may be altered when subjected to the externally applied voltage, but for purposes of this description the changes in those other dimensions are not expected to effect the desired operation of the piezoelectric actuator 102 in controlling a gap 153 between the nose cap 135 of the adjustable nozzle 114.

In one embodiment, the sealing member 138 is a self-aligning valve-orifice sealing mechanism coupled to the insulating spacer 140. The self-aligning valve-orifice sealing mechanism may take the form of a spherical valve-orifice sealing device as described in U.S. Pat. No. 6,202,669 or may take other forms commonly employed for sealing a flow orifice. The sealing member 138 is electrically conductive and is attached to the electrical connection 154, which is further coupled to the electrical feed-through 144. The conductive path may be advantageously used to measure distance (by capacitance) and contact (by resistance) between the nose cap end face 156 of the adjustable nozzle 114 and an end face 158 of the sealing member 138.

In operation, fluid flows through the adjustable nozzle 114 from the first pressure fitting 108. To receive the fluid into the chamber 104, the dimension 146 of the piezoelectric actuator 102 is changed or displaced by altering the magnitude and/or polarity of the voltage applied to the piezoelectric actuator 102.

Figure 3:
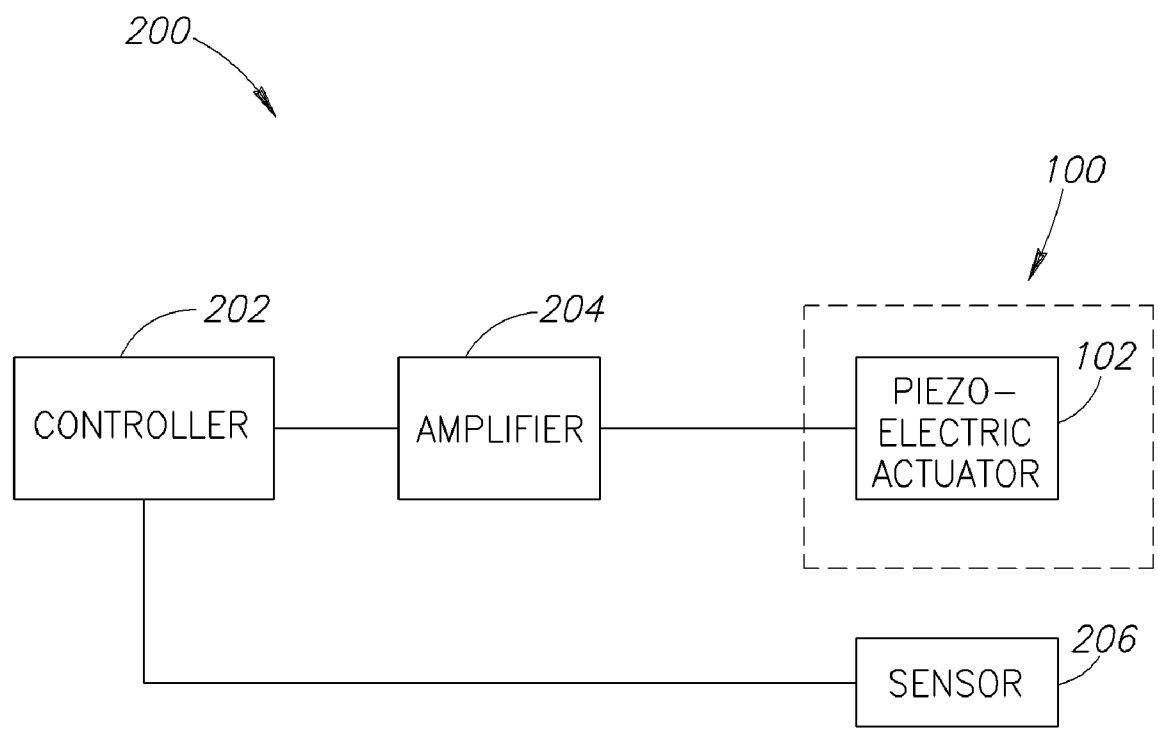
FIG. 3 is a schematic diagram of a control system for controlling a voltage applied to a piezoelectric actuator of a flow control device.

FIG. 3 shows a control system 200 having a controller 202 for controlling an amplifier 204 that supplies a voltage magnitude and polarity necessary to drive the piezoelectric actuator 102 of the flow control valve 100. A sensor 206 is in fluid communication with the chamber 104 to detect a flow or a pressure of the fluid within or about to exit the chamber 104. The sensor 206 transmits a signal to the controller 202, and based on the signal from the sensor 206, the controller 202 may alter the applied voltage level and/or polarity by way of the amplifier 204 to thus control or regulate an output flow from the flow control valve 100.

Figure 4:
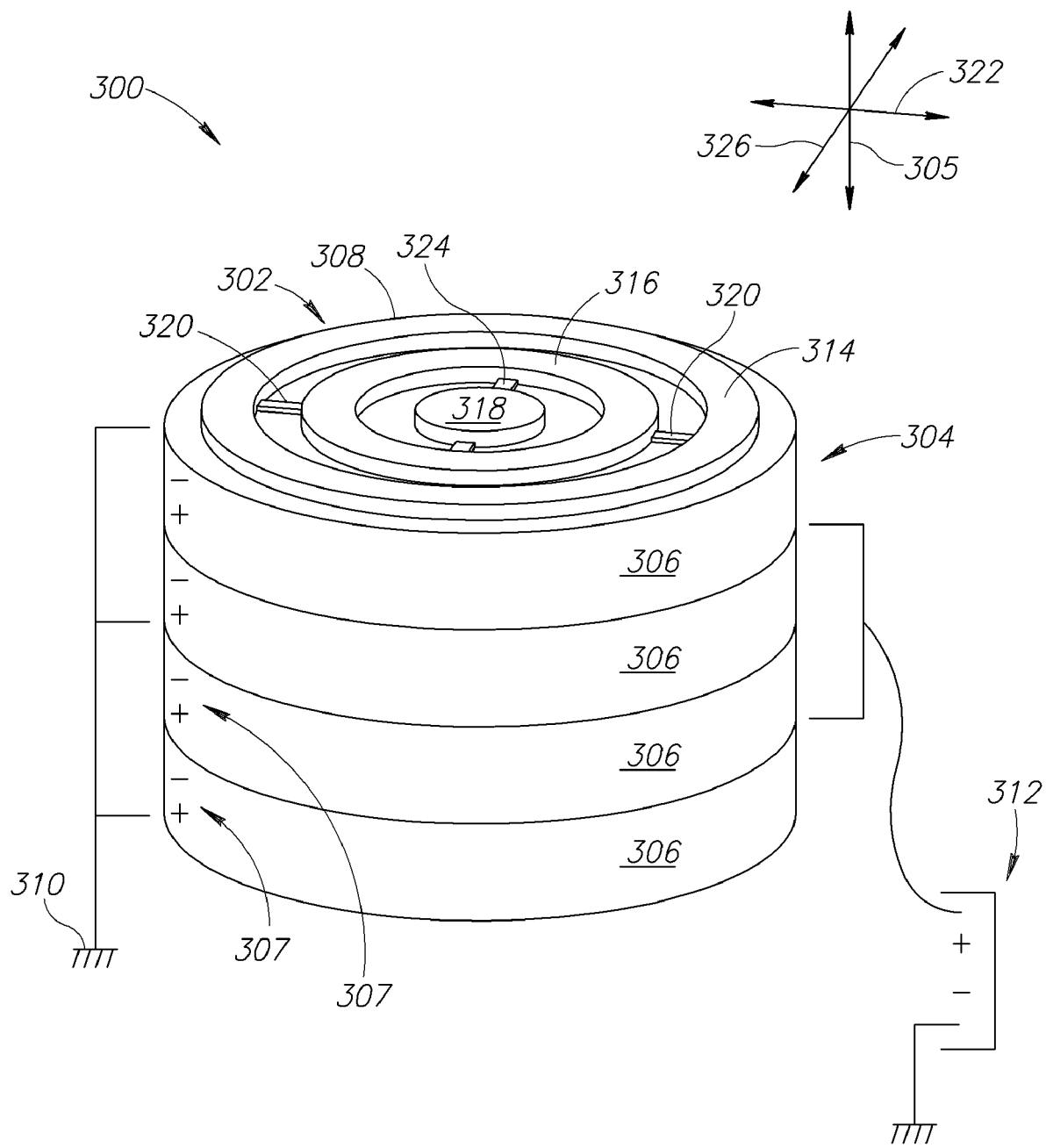
FIG. 4 is a schematic perspective view of a gimballed valve according to an embodiment of the invention.

FIG. 4 shows a gimballed valve assembly 300 that includes the sealing member 138 (FIG. 2) for the adjustable nozzle 114 (FIGS. 1 and 2) and the piezoelectric actuator 102 as described above. The gimballed valve assembly 300 includes a gimballed valve 302 positioned on a piezoelectric actuator 304 having a plurality of piezoelectric members 306. The gimballed valve includes a plurality of support rings 308. The number of piezoelectric members 306 and support rings 308 may be fewer or greater than shown. The gimballed valve assembly 300 is coupled to the support structure 106 (FIG. 1) by way of eutectic solder, epoxy or some other equivalent bonding agent that may or may not be temperature dependent to form the bond between the piezoelectric actuator 304 and the support structure 106 (FIG. 1).

The piezoelectric members 306 may take the form of toroidal-shaped (i.e., donut shaped) ceramic members stacked one on top of the other in a stacked arrangement. Accordingly, the shape of the members 306 provides central opening within the piezoelectric actuator 304, where the central opening may be oriented substantially along a first axis 305. In the illustrated embodiment, the piezoelectric members 306 are arranged as a stack of four members where each member has a polarity 307 that is opposite a polarity 307 of an adjacent member. As schematically shown in the illustrated embodiment, the piezoelectric members 306 include metallization layers (not shown) located on each side of the members in which one side is electrically connected to ground 310 (e.g., the support structure 106 (FIG. 1)) and the other side is electrically connected to an excitation voltage 312. By way of example, the excitation voltage 312 may take the form of a pulsed or steady-state direct current (DC) excitation voltage.

The plurality of support rings 308 includes at least an outer support ring 314 and an inner support ring 316. Located within an inner perimeter of the inner support ring 316 is a gimballed closure device or center closure member 318 according to one embodiment of the invention. Although two support rings are shown, it is appreciated that additional support rings may be included in the gimballed valve 302. The outer support ring 314 is coupled to the inner support ring 316 with a first pair of flexures 320 oriented in a second direction, which may be substantially aligned with an axis 322 and substantially orthogonal to the first axis 305. Likewise, the center closure member 318 is coupled to the inner support ring 316 with a second pair of flexures 324 oriented in a second direction, which may be substantially aligned with axis 326 and substantially orthogonal to both axes 305 and axis 322. It is preferable, but not necessary, that the first direction be orthogonal to the second direction. The flexures 320, 324 permit at least the center closure member 318 to deflect relative to the outer support ring 314 and deflect substantially along the axis 305.

The operation of the gimballed valve 302 in cooperation with the adjustable nozzle 114 (FIGS. 1 and 2) may advantageously correct for misalignment caused when the longitudinal axis of the nozzle 114 is not perpendicular to a substantially planar surface of the center closure member 318. By way of example, the misalignment may result from machining and assembly tolerances between the threaded portion of the nozzle and the support structure. Additionally or alternatively, the misalignment may result from attachment of the piezoelectric actuator 304 to the support structure, for example if the bonding agent is thicker on one side than the other side, thus causing the actuator 304 to tilt or lean, even slightly.

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The embodiments of the invention in which an exclusive property or privilege is claimed are defined as follows:

1. A piezoelectric actuator comprising:
   a plurality of piezoelectric members positioned in a stacked arrangement, each member having a toroidal shape with an inner surface defining a central opening and a coaxial axis; and
   a gimballed valve having at least two support rings and a center closure member, the at least two support rings coupled together with a pair of flexure members, the at least two support rings having an outer support ring and an inner support ring, the inner support ring coupled to the center closure member with another pair of flexure members, the outer support ring coupled to one of the piezoelectric members such that at least the center closure member is located positioned over the central opening.

2. The piezoelectric actuator of claim 1, wherein each piezoelectric member includes conductive elements coupled to a first side of the piezoelectric member and an opposite side of the piezoelectric member.

3. The piezoelectric actuator of claim 1, wherein each piezoelectric member includes a polarity.

4. The piezoelectric actuator of claim 1, wherein the piezoelectric members are positioned in the stacked arrangement with alternating polarities.

5. The piezoelectric actuator of claim 1, wherein each support ring is substantially cylindrical.

6. The piezoelectric actuator of claim 1, wherein the support rings are substantially concentrically positioned with respect to one another.

7. The piezoelectric actuator of claim 1, wherein the gimballed valve is bonded to at least one of the piezoelectric members with an amount of solder.

8. The piezoelectric actuator of claim 1, wherein the piezoelectric members are plated.

9. The piezoelectric actuator of claim 1, wherein the pair of flexures coupling the at least two support rings together and the pair of flexures coupling the inner support ring to the center closure member are oriented orthogonal to one another and both pairs are oriented orthogonal to the coaxial axis.

10. The piezoelectric actuator of claim 1, wherein the plurality of piezoelectric members positioned in the stacked arrangement includes at least two members.

11. A flow control valve comprising:
    a piezoelectric actuator having at least one piezoelectric member positioned in a stacked arrangement, the at least one member having a toroidal shape with an inner surface defining a central opening and a coaxial axis; and
    a gimballed valve having at least two support rings coupled together with a pair of flexure members, the at least two support rings having an outer support ring and an inner support ring, the inner support ring coupled to the center closure member with another pair of flexure members, the outer support ring coupled to one of the piezoelectric members such that at least the center closure member is located positioned over the central opening.

12. The flow control valve of claim 11, wherein each support ring is substantially cylindrical.

13. The flow control valve of claim 11, wherein the support rings are substantially concentrically positioned with respect to one another.

14. The flow control valve of claim 11, wherein the gimballed valve is bonded to the at least one piezoelectric members with a bonding agent.

15. The flow control valve of claim 11, wherein the pair of flexures coupling the at least two support rings together and the pair of flexures coupling the inner support ring to the center closure member are oriented orthogonal to one another and both pairs are oriented orthogonal to the coaxial axis.

\* \* \* \* \*